United States Patent [19]

Noone et al.

[11] Patent Number: 4,791,290

[45] Date of Patent: Dec. 13, 1988

[54] PHOTOELECTRIC CONTROL UNIT WITH COOLING CHAMBER

[75] Inventors: Seán Noone, Corclough West, Belmullet, County Mayo; Michael Quinlan, Cahercoulish; Denis O'Connell, Limerick, all of Ireland

[73] Assignee: Sean Noone, Mayo, Ireland

[21] Appl. No.: 903,667

[22] Filed: Sep. 4, 1986

[30] Foreign Application Priority Data

Oct. 18, 1984 [IE] Ireland .................................. 2516/84
Oct. 16, 1985 [GB] United Kingdom ................. 8525440

[51] Int. Cl.⁴ .............................................. H01J 5/62
[52] U.S. Cl. .............................. 250/239; 250/214 AL; 439/487; 174/52.2
[58] Field of Search ................ 250/239, 238, 214 AL, 250/214 SW; 174/52 PE; 439/485, 487

[56] References Cited

U.S. PATENT DOCUMENTS

| | | | |
|---|---|---|---|
| 2,709,224 | 5/1955 | Garnick | 250/239 |
| 3,163,768 | 12/1964 | Bernheim | 250/239 |
| 3,402,383 | 9/1968 | Hilzen | 439/487 |
| 4,023,035 | 5/1977 | Rodriguez | 250/239 |

Primary Examiner—Edward P. Westin
Assistant Examiner—Charles F. Wieland
Attorney, Agent, or Firm—Scully, Scott, Murphy & Presser

[57] ABSTRACT

A photoelectric control unit for street lighting comprises control means including a photoelectric sensor mounted on a printed circuit board for switching on a street lamp when the intensity of light falling on the sensor falls below a preset value. Electrical connection means between the P.C.B. and the lamp is provided by three connector pins which are led through a cooling chamber or stem. The pins are cranked to closely follow the contour of the chamber to dissipate heat through the chamber walls. The chamber is also filled with a high thermal conductivity potting compound for heat transfer to the walls of the chamber.

One controller for such a photoelectric control unit includes a switching means provided by a relay and a triac connected in parallel. The triac operates to prevent the relay being subjected to high voltages during switching and hence prevents pitting of the relay contacts.

6 Claims, 7 Drawing Sheets

PHOTOELECTRIC CONTROL UNIT WITH COOLING CHAMBER

BACKGROUND OF THE INVENTION

1. Field of the Invention

The invention relates to a photoelectric control unit for a lighting circuit as a street lighting circuit.

2. Description of Prior Art

In general, street lamps are operated by photoelectric control units comprising a photoelectric sensor and a load switching means. The control unit turns on the lamp when the intensity of incident light falling on the photoelectric sensor is below a pre-set value and turns off the lamp when the intensity of the light is above another pre-set value. Such control units are generally connected to a lamp through connector pins. Heat is generated in these connector pins directly by the current carried by the pins and indirectly by heat from the lamp. This heat may cause mal-functioning of the control unit which greatly reduces the useful life of such units. One such unit is described in British Patent Specification No. 1,110,263.

The controllers for lighting control units which are presently available are either electro-mechanical, electronic or a combination of both. Electro-mechanical units switch power to a load by opening or closing a pair of heavy duty electrical contacts. Generally the line voltage has a peak value of over 310 volts which causes arcing across the contacts as they open and close. The arcing in turn causes pitting of the contact surfaces resulting in a short useful life-span for the controller.

A further problem with conventional controllers is that in time, the light-level threshold can drift outside the specified limits due to drift of the threshold reference value and changes in the characteristics of the light detecting sensor which is normally a light dependent resistor or LDR. Conventioanl units employ a thermal switching technique where the LDR controls the current through, and thus, the temperature of a bi-metallic strip. The threshold point is determined by the force required from the thermal strip to change over spring loaded electrical contacts. The characteristics of the spring load as well as those of the bimetallic strip change with time and this causes the accuracy of the unit to drift outside the acceptable limits. Also, the LDR is required to conduct large currents to heat the bi-metallic strip and the resulting self-heating effect causes the LDR to change its characteristics over a period. The LDR units commonly used in existing controllers, gradually break down allowing moisture and impurities to effect the selenium cell. This combined with temperature rise in the device contributes to further drift of the light level threshold.

OBJECTS OF THE INVENTION

This invention is directed towards providing a photoelectric control unit for a lighting circuit which will have a long useful life.

The invention is also directed towards providing a controller for a photoelectric control unit which will minimise pitting of the contact surface and hence prolong the useful life of the unit.

SUMMARY OF THE INVENTION

According to one aspect the invention provides a photoelectric control unit for a lighting circuit comprising control means for switching an output, the control means including a photoelectric sensor, electrical connection means between the control means and the output, and a cooling chamber through which the connection means are led.

In one embodiment of the invention typically the cooling chamber comprises a base wall and a side wall upstanding from the base wall.

In a preferred embodiment of the invention the connection means comprises three spaced-apart connector pins. Preferably each pin is arranged in the chamber for heat transfer to the walls of the chamber.

In a preferred embodiment of the invention each connector pin is cranked intermediate its ends to define a cooling chamber base wall engaging portion and a cooling chamber side wall engaging portion. Typically the cooling chamber is substantially filled with a heat conducting medium. Preferably the heat conducting medium is a potting compound.

In a further embodiment of the invention the control means comprises a printed circuit board mounted in a printed circuit board housing, the photoelectric sensor being mounted to the printed circuit board.

In another embodiment of the invention the controlled unit includes a cover of translucent material through which light passes to the photoelectric sensor. Usually the cover is of conical shape and is mounted to the printed circuit board housing.

Typically the pins are connected to the output through a socket. Usually the socket is mounted in a socket receiving chamber connected to the cooling chamber.

In a preferred embodiment of the invention the control unit includes a mounting means for mounting the unit to a fixture. Typically the socket receiving chamber is formed with the mounting means. In one case the mounting means comprises a flange provided on the socket receiving chamber.

In one embodiment of the invention the output comprises a street lamp.

In another aspect the invention provides a controller for a photoelectric control unit, the controller comprising a photoelectric sensor, comparing means for comparing the intensity of sensed light with preset light intensity and switching means operated by the comparing means to switch an output.

Typically the switching means comprises a switch which operates over a large voltage range.

In a particular preferred embodiment of the invention the switch comprises a relay and a triac electrically connected in parallel. Typically the triac is provided in a triac control circuit which is operated by the comparing means.

On switching of the switch, the relay conducts at low voltages and the triac conducts at high voltages.

In one embodiment of the invention the photoelectric sensor comprises a light sensitive resistor whose resistance increases with the intensity of incident light.

Preferably the controller includes a capicitor which is charged when the triac operates to keep the relay closed for a short period to ensure continuous conduction.

In another preferred embodiment of the invention the photoelectric sensor comprises a phototransistor. Typically the switching means comprises a thermal switch. Preferably control means are provided for maintaining the thermal switch open while light falling on the phototransistor is above a preset level.

In one embodiment of the invention the control means comprises a transistor and thyristor combination. Preferably conduction through the transistor drives the thyristor to apply power to the heating element of the thermal switch to maintain the switch contacts open when the light level is above a preset value and ceasing to conduct and hence allowing the thermal switch contacts to close when the light level is below a preset value to switch an output.

ADVANTAGES OF THE INVENTION

The advantages of the cooling chamber is in dissipating the heat in the connectors so that the heat carried by the connectors to be electronic components is minimised so that the unit has a long life, in use.

The advantage of using a relay and triac combination in the controller to switch the controller greatly increases the useful life and reliability of the controller.

These and other objects and advantages of the invention will be readily apparent from the following description of some preferred embodiments of the invention which are given by way of example only with reference to the accompanying drawings.

DETAILED DESCRIPTION

Referring to the drawings and initially to FIGS. 1 to 5 thereof there is illustrated a photoelectric control unit according to the invention and indicated generally by the reference numeral 1. The control unit 1 comprises control means, in this case mounted on a printed circuit board 2 for switching and output, in this case a street lamp 3. The control means as will be described in more detail below, includes a photoelectric sensor which causes power to the lamp 3 to be switched on when the amount of light falling on the sensor exceeds a pre-set value, in this case 55 lux. The sensor is mounted on the printed circuit board 2 and electrical connection means between the printed circuit board and the lamp 3 is provided by three connector pins 4 which are shaped at their lower ends 5 to engage in a twist-socket provided on the lamp 3. The connector pins 4 are connected at their upper end 6 to connection points (not shown) on the printed circuit board through flexible connecting wires 7. The connections between the connector pins 4 and printed circuit board 2 are capable of withstanding vibrations and/or shudder which would normally be encountered in use with street lanterns.

To prevent overheating of the connector pins 4 and consequent malfunctioning and possible damage to the electrical components mounted on the printed circuit board 2 the pins 4 are led through a cooling means in the form of a stem which in this case is defined by a cooling chamber 8 where heat generated in the pins 4 is dissipated through the walls of the chamber 8.

Figure 5:
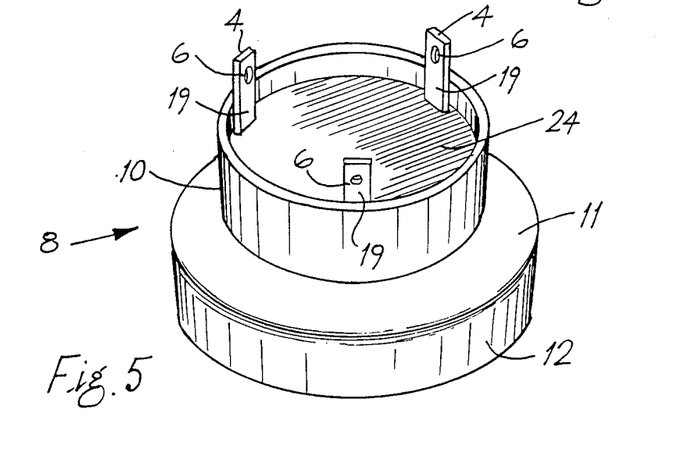
FIG. 5 is a perspective view from above of a portion of the control unit.

Referring particularly to FIG. 5 the cooling chamber 8 comprises a cylindrical side-wall 10 and a disc-shaped base wall 11 which extends radially outwardly of the side wall 10. A skirt 12 extends axially downwardly from the outer extremity of the base wall 11. The base wall 11 is formed with three holes 13 which are equi-spaced apart at 120° and through which the connector pins 4 are led. As will be apparent particularly from FIG. 1 each of the connector pins 4 is cranked at 15 and 16 to define an axially depending leg portion 17, an interconnected radial at base wall portion 18 and an axially extending side wall portion 19. Each of the pins 4 is retained in position in a retaining hole 14 by a self tapping screw 21 which extends through the hole 14 to engage in a corresponding hole 22 in the base wall extending portion 18 of each connector pin 4. The connector pins 4 which are sized and shaped so that a large surface area of the connector pins 4 is in contact with the side and base walls 10, 11 of the cooling chamber. Consequently heat generated in the connector pins 4 is dissipated through the walls of the chamber 8. To assist heat transfer the cooling chamber 8 is also substantially filled with a heat transfer medium, in this case in the form of a potting compound 24 which conducts heat away from the pins 4 and into the side and base walls 10, 11 of the cooling chamber 8. The potting compound used may be any suitable incapsulating compound having a high thermal conductivity such as a Humiseal 2B74.

Figure 1:
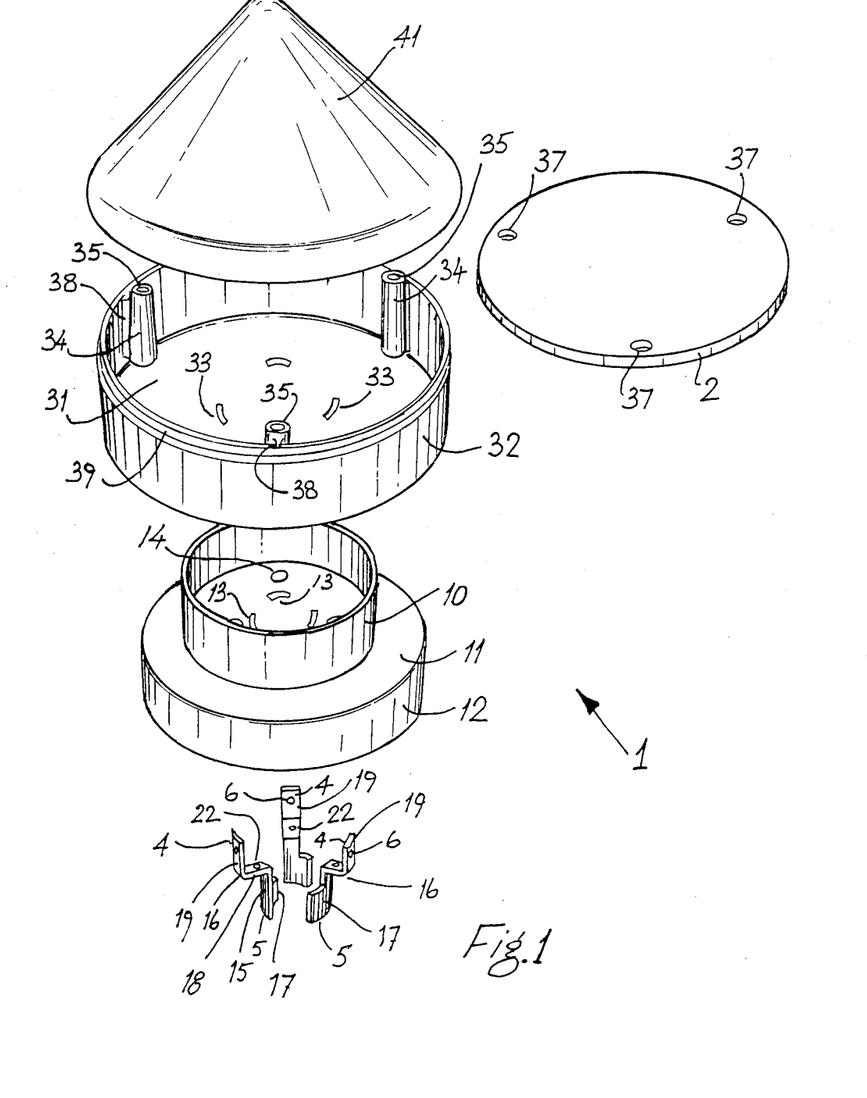
FIG. 1 is an exploded perspective view of a photo electric control unit according to the invention.
Figures 2, 3:
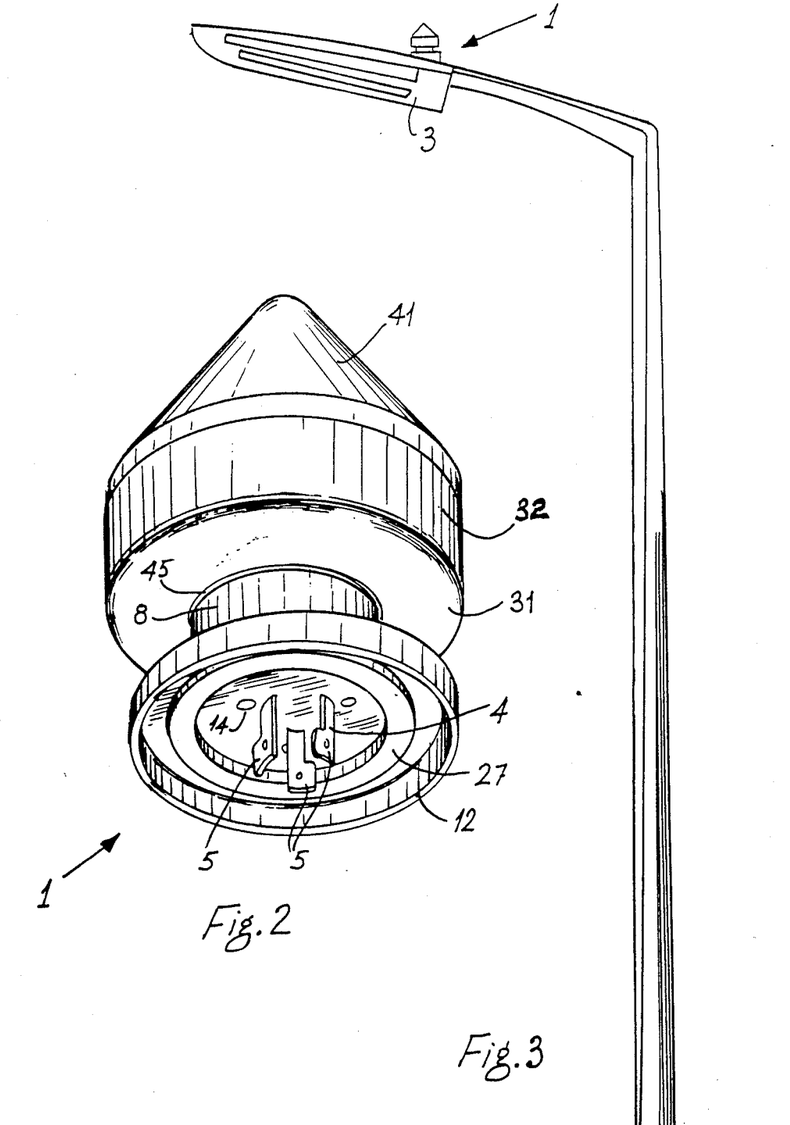
FIG. 2 is a perspective view of the photoelectric control unit of FIG. 1, assembled.
FIG. 3 is a diagrammatic side view illustrating the unit of FIGS. 1 and 2 in use.
Figure 4:
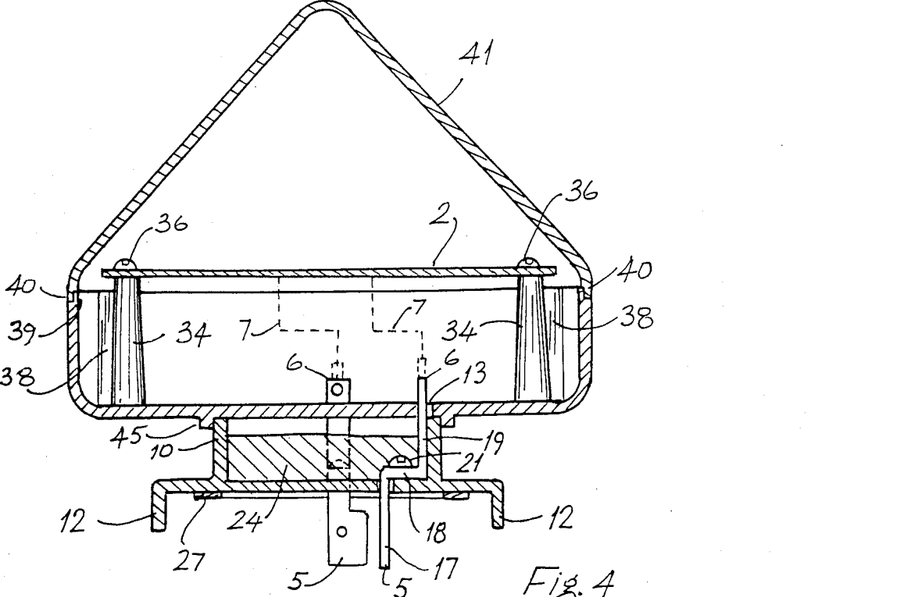
FIG. 4 is a side, partially cross-sectional view of the control unit of FIGS. 1 and 2.

A sealing ring gasket 27 which is usually of neoprene material is provided on the base wall 11 of the cooling chamber 8 to prevent ingress of moisture and dirt through the joint between the cooling chamber skirt 12 and the socket provided on the lantern 3.

It will be appreciated that the cooling chamber defines a stem which both raises the assembly from the hot parts of the lantern and minimises the heat carried by the connectors to the electronic components mounted on the printed circuit board. In tests, in which the control unit was mounted on a 400 watt lantern at room temperature, the use of the cooling chamber was found to reduce the temperature of the connector pins at the PCB connection points by up to 10° which represents a large improvement in reliability.

It will also be appreciated that the control unit may be used to control the operation of one or a plurality of street lamps or for controlling the operation of any outside lighting systems.

The printed circuit board 2 is mounted in a printed circuit board housing 30 which comprises a substantially discshaped base 31 and a cylindrical side wall 32 extending axially upwardly from the base 31. Three connector pin receiving slots 33. equi-spaced at 120°, extend through the base 31. Three screw receiving pillars 34 extend upwardly from the base 31 adjacent to side wall 32 and are also equi-spaced at 120° around the housing. Each of the pillars 34 is formed with a hole 35 for reception of a self-tapping screw 36 which extends through corresponding holes 37 in printed circuit board 2 for mounting the board 2 to the pillars 34. Reinforcing webs 38 extend between each pillar 34 and the side wall 32.

The upper rim of the circuit board housing side wall 32 is formed with a step portion 39 for reception of a complementary step portion 40 which extends around the lower periphery of a translucent conical cover 41 through which light passes to the photoelectric sensor on the printed circuit board 2. The canopy or cover 41 is of conical shape to prevent accumulation of dirt and also discourage birds from perching on the cover. The cover is typically of a plastics material which is treated to protect against ultra-violet light. For fitting the printed circuit board housing 30 and cooling chamber 8 together the housing 30 is formed with a socket which in this case is defined by a skirt 45 which extends axially downwardly approximately mid-way across the base for reception of a spigot defined by the upper edge of the side wall 10 of the cooling chamber 8.

To prevent ingress of dirt and moisture, the component parts of the control unit are securely fixed together and the unit is then coated with a sealing compound to provide additional defensive measures against moisture and dirt ingress.

One advantage of the invention is that the connection means between the control means and the output is arranged to dissipate any heat generated and hence protect the components of the control means. Thus, a more efficient and reliable switch which has a long life in use is provided.

Figure 6:
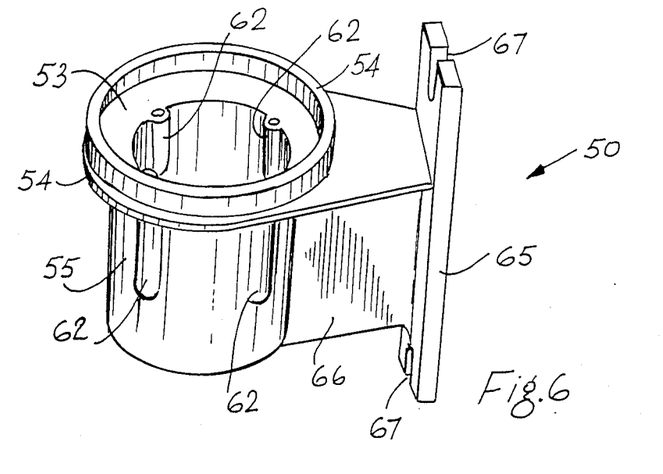
FIG. 6 is a perspective view of a socket housing attachment for use with the control unit of FIGS. 1 and 2.
Figure 7:
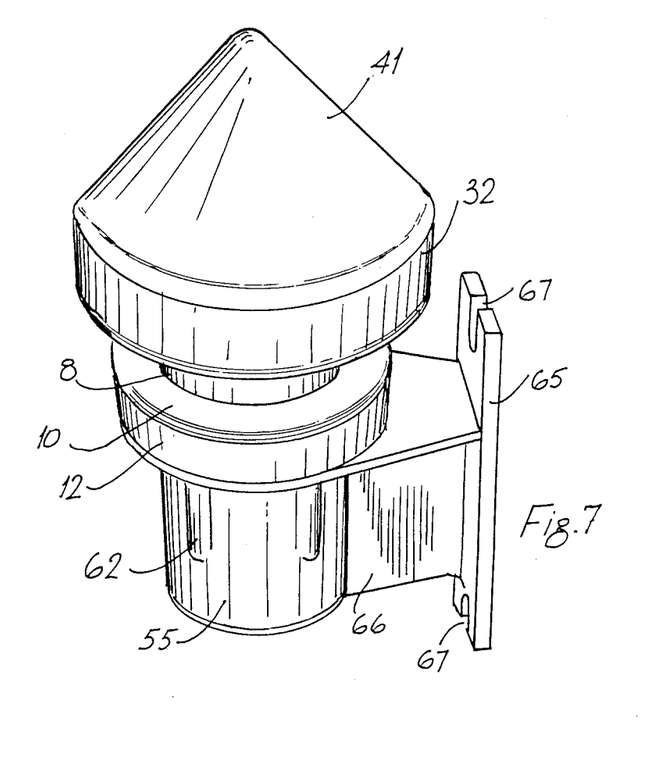
FIG. 7 is a perspective view of a control unit with the housing of FIG. 6 attached.
Figure 8:
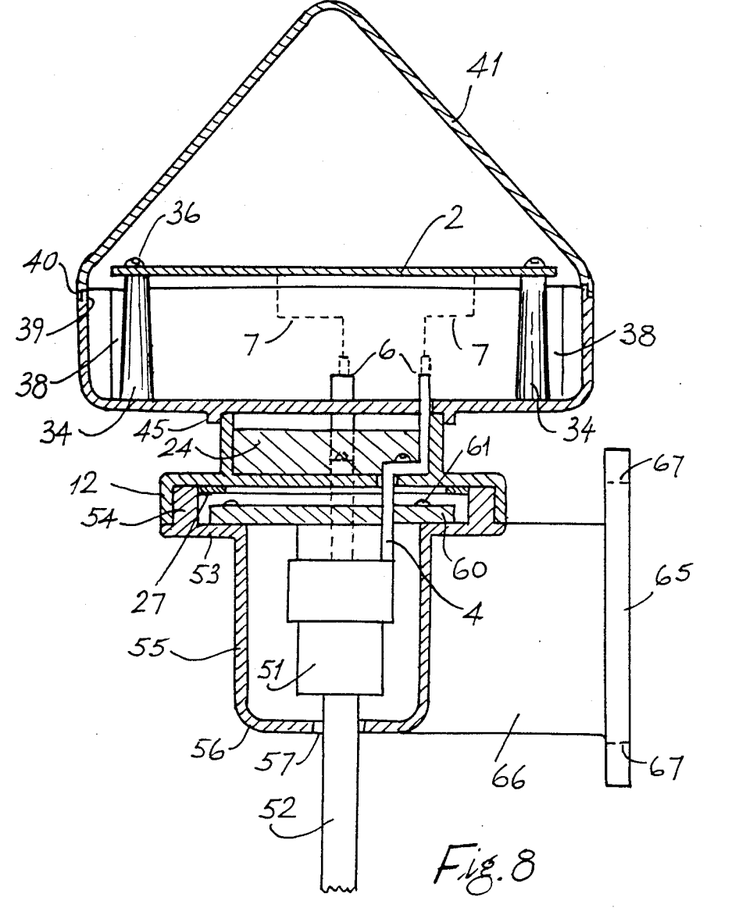
FIG. 8 is a side cross-sectional view of the control unit with the housing attached.

Referring to FIGS. 6 to 8 there is illustrated a modified photoelectric control unit which is similar to that described above with reference to FIGS. 1 to 5 and like parts are assigned the same reference numerals. In this case the unit includes an electrical socket receiving housing 50 for housing an output socket 51 which is connected at one end to the connector pins 4 and which is connected through an outlet cable 52 to the output which it is desired to switch such as a street or security lantern. The housing 50 includes an upper radial wall 53 and an axially upwardly extending side wall portion 54 which defines a spigot for insertion in the socket defined by the skirt 12 of the cooling chamber 8. A lower cylindrical side wall portion 55 extends downwardly from the upper wall 53 of the housing 50. The lower side wall portion 53 of the housing 50. The lower side wall portion 55 is turned inwardly to define a base wall 56 having a central opening 57 through which the electrical connection lead 52 is lead from the socket 51 for connection to an output. The socket 51 is carried by a mounting plate 60 which is fixed in position by selftapping screws 61 which engage in corresponding screw receiving portions 62 which extend downwardly from the upper wall 53. The sealing ring gasket 27 seals the joint between the cooling chamber skirt 12 and the socket receiving housing 50.

Mounting means for mounting the control unit on a fixture such as a wall is in this case provided by a mounting flange 65 which is connected to the socket receiving housing side wall 55 by a connecting web 66. The flange 65 is formed with two axially extending slots 67 for ease of mounting to a fixture. The particular advantage of the control unit for a photoelectric switch according to this embodiment of the invention is that by using the electrical socket receiving housing attachment 50, the control unit may be used in a wide range of applications including security lighting and in other applications where it may be necessary to mount the control unit on a fixture such as a wall rather than directly on a lantern.

Figure 9:
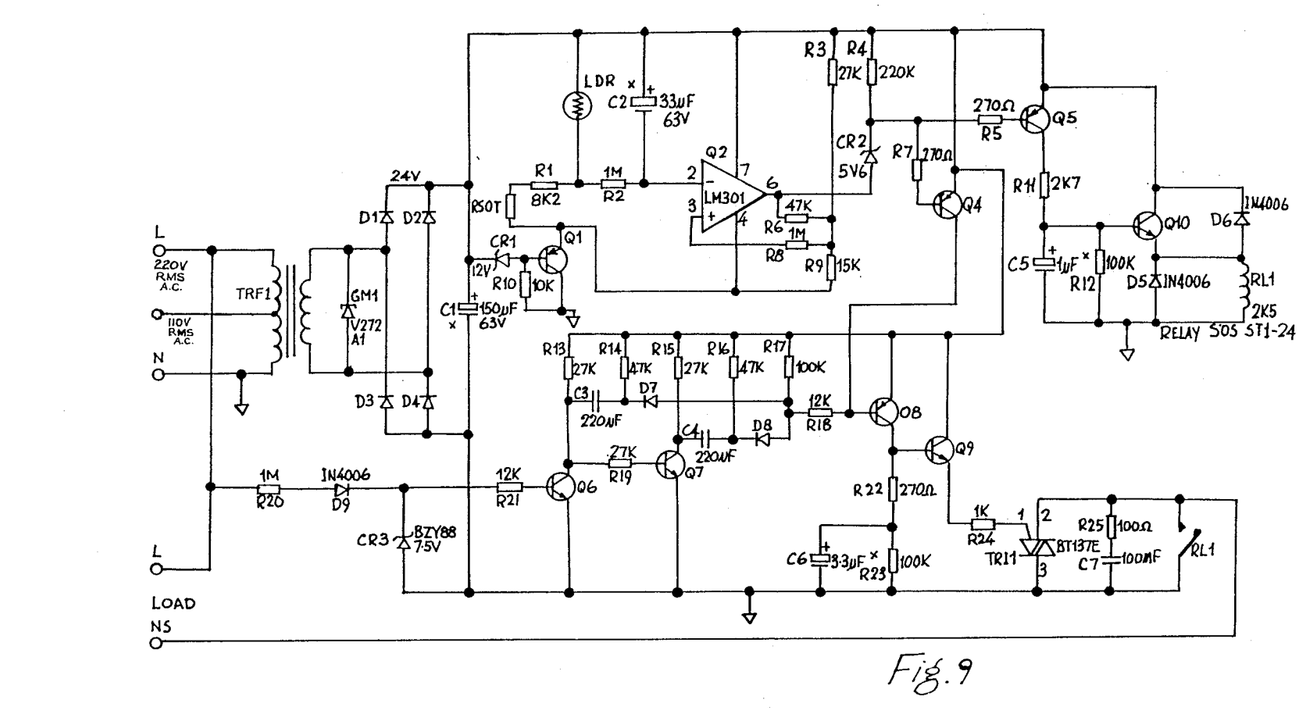
FIG. 9 is a circuit diagram of a controller for a photoelectric control unit and, FIG. 10 is a circuit diagram of another controller for a photoelectric control unit.

Referring to FIG. 9 there is illustrated a circuit diagram of a controller for use with a photoelectric switch such as the photoelectric switch described above with reference to FIGS. 1 to 8. The function of the controller is to switch power to a lantern according to the surrouding brightness. The controller comprises a photoelectric sensor, comparing means for comparing the intensity of sensed light with a preset light intensity and switching means operated by the comparing means to switch an output.

The photoelectric sensor is in this case provided by a light dependent resistor (LDR) which is used to monitor the light level and at specific threshold limits either to close or open the switch. The threshold limits are set to the requirements of the particular user.

The switching means is in this case provided by a relay RL1 and a triac TRI1 connected in parallel. When it is required to switch the load the triac TRI1 is engaged and this is followed a short time later by closure of the relay contacts RL1. In this way the relay RL1 is not subjected to high voltages during the switching action and the triac TRI1 is not given enough time to heat. When the load is to be switched out the relay RL1 is disengaged and this is followed a short time later by the switching off of the triac TRI1. Again the relay RL1 is removed from the circuit while the triac TRI1 is holding the voltage at a low level and the triac TRI1 is not given enough time to heat. In both of the above cases the triac TRI1 will cease to conduct when the relay RL1 shorts it out.

The circuit operates as follows. A transformer TRF1 converts incoming 220 Vrms (nom) to 24 Vrms (nom) and this lower AC voltage is rectified by a bridge consisting of diodes D1 to D4. Capacitor C1 is smoothing capacitor. 24 Vdc is the supply to the remainder of the circuitry. A centre tap provided on the transformer TRF1 enables 110 Vrms (nom) supply to be used.

The LDR resistance is monitored by an operational amplifier A1 through a delay circuit consisting of a capacitor C2 and a resistor R2. This delay, of approximately 30 seconds, prevents abrupt changes in the value of the LDR reaching A1. The operational amplifier is used in the comparator mode and it compares the voltage level on the capacitor C2 with a threshold value which is determined by resistors R3, R9 and R6. Resistors R3 and R9 form a potential divider and resistor R6 provides hysteresis. This is to prevent unwanted oscillation during the switching action. Threshold calibration is possible by selecting value for Rsot that will cause the unit to switch at the correct light level. For high reliability the voltage across the op-amp must be held at a value less than the maximum rating of the device. The op-amp is rated for 36 V, but a voltage of 12 V which is provided by a transistor Q1 is used. A zener diode CR1 and a resistor R10 hold the base voltage on the transistor Q1 at 12 V below rail resulting in an emitter voltage which is approximately 11.4 V below rail. The transistor Q1 also acts as a regulator, further reducing the possibility of oscillatory switching.

Transistors Q4 and Q5 allow the output of op-amp A1 to switch the relay and the triac. A zener diode CR2 is used to ensure that the transistors Q4 and Q5 are switched off when the op-amp output is 'high'. The LM301 output is unable to come within 1.5 volts of the rail value and wound not, therefore, be able to switch off the transistors Q4 and Q5. The zener diodes overcomes this.

During darkness the voltage on pin 2 of the op-amp is low and the op-amp output is high. Therefore transistors Q4 and Q5 are switched off during the night and on during the day.

The triac TRI1 is switched through transistors Q4, Q8 and Q9. The transistor Q8 is disabled when the transistor Q4 is turned on because its base is held at the emitter voltage. When the triac TRI1 is to be turned on the transistor Q4 ceases to conduct allowing negative going pulses from a mains cycle crossover detector, consisting of two transistors Q6 and Q7, to influence the transistor Q8. These pulses occur when the mains sine wave is close to zero volts and cause the transistor Q8 to quickly charge up capacitor C6 through the resistor R22. The voltage at the base of the transistor Q9 then becomes high enough to switch on the triac TRI1. The resistor R24 which is connected between the gate of the triac TRI1 and the emitter of the transistor Q9 serves to limit the current through the transistor Q9 to a reliable level. The resistor R22 also limits the peak current through the transistor Q8 to a reliable level. When the triac TRI1 is to be switched off the transistor Q4 starts conducting thus disabling the transistor Q8. The voltage on the base of the transistor Q9 now begins to decrease as the energy on the capacitor C6 is discharged through the resistor R23. After a time delay the voltage on the transistor Q9 base will be too low to maintain the triac TRI1 in conduction. This time delay is needed for the triac/relay sequencing function and it provides sufficient time to allow the relay to disengage before the load voltage increases.

For increased reliability and to reduce radio interference the triac TRI1 is switched during the mains zero crossover points. These are detected by means of transistors Q6 and Q7. The mains is sampled through a resistor R20 and limited by a zener diode CR3 and a diode D9. The resulting waveform that arrives at the base of the transistor Q6 is approximately square and is further squared by the transistor Q6. A differentiator network consisting of a capacitor C3 and a resistor R14 provides a negative going pulse each time the voltage on the collector of the transistor Q6 makes the transition from rail to ground. This transition represents the zero cross point when the main cycle is going from negative to positive. In a similar manner the transistor Q7, capacitor C4 and resistor R16 will generate a pulse during the positive to negative mains cycle transition. Diodes D7 and D8 ensure that only the negative going pulses are transmitted to the base of the transistor Q8.

The relay RL1 is operated through transistors Q5 and Q10. The relay RL1 is of the normally on type and when the base voltage of the transistor Q10 is low the switch will be closed. When the relay RL1 is to be engaged the transistor Q5 will cease to conduct. The voltage on the capacitor C5 will then begin to decrease as it is discharged through the resistor R12. After a delay dictated by the capacitor C5 and the resistor R12 the base voltage of the transistor Q10 will go below the minimum holding value for the relay RL1 and the relay contacts close. This delay is needed to allow the triac, TRI1 which is being switched simultaneously, time to reduce the voltage across the relay contacts to an acceptable level. This is part of the triac/relay sequencing function. When the relay RL1 is to be disengaged (at morning) the transistor Q5 again conducts, charging up the capacitor C5 quickly. The relay RL1 is then opened quickly before the triac TRI1 is disengaged, thus protecting the switch contacts. Diodes D5 and D6 protect the transistor Q10 from the back end that normally accompanies the switching of a relay. A normally 'on' realy is used here so that in the event of failure the street lantern being controlled will be switched on permanently. It is expected that most failures within the controller will result.in loss of power to the relay and the controller will thus meet the requirement that the lantern be switched on. Varistor protection is employed in the circuit to prevent large mains bourne spikes and transitions getting to the circuitry. A varistor, GM1, is placed after the mains transformer TRF1 and takes advantage of the transformer's secondary resistance. The varistor's resistance decreases significantly as the voltage across it increases and this is used to limit the voltage at the transformer secondary. The transformer, TRF1, because of its inherent winding resistances will not be damaged by the extra load placed on it during line transients. A varistor is used here in preference to a zener diode because of its greater speed and current handling capabilities.

LDR self heating is reduced by minimising the power dissipation within the controller through the use of high external resistor values. Power dissipation is approximately 10 mw. The use of transistors allows the voltage on the LDR to be measured despite the high source impedance due to the large resistor values. Any suitable LDR may be used and preferably the LDR should be hermetically sealed to ensure that moisture and impurities cannot enter the LDR and alter its characteristics. The particular LDR chosen is the CLM5MGM device which has a stable light to resistance relationship after 100 hours burn-in. All NPN transistors are typically type BC237B-92 while all PNP transistors are typically type BC212B-92. All resistors are usually $174 \times \pm 5\%$ carbon. The elements designated X are typically solid aluminium 40V and those designated * are usually long life aluminium electrolytic ELCO series.

A conformal coating compound may be applied to both the board and the components to ensure rigidity of the components during heavy vibrations or lantern mast shudder, to protect the electronic circuit from impurities from moisture and dirt ingress and to further protect the board and the components from UV radiation through the conical canopy or cover. As ultra-violet tends to break down plastic, both the housing and the conical are doped with a recommended U.V. inhibitor. The use of a relay assisted triac overcomes the problem associated with the switching of heavy loads. When relay contacts open or close arcing will occur between the relay contacts and this will, in time, cause the contacts to become pitted and eventually non-operational. The arcing problem could be overcome using a semiconductor switch in the form of a triac or transistor. However, such an arrangement because of its saturation voltage dissipates power resulting in heating. This heating will severely curtail the reliability of the device. Thus, the controller according to this aspect of the invention is particularly reliable in use and greatly increases the useful life of a photoelectric control unit. The method of switching using a relay assisted triac has been tested by subjecting a prototype to 40,000 switching operations which is the equivalent of over 100 years operation, and when examined after the test the relay was found to be in excellent condition without any signs of pitting.

Figure 10:
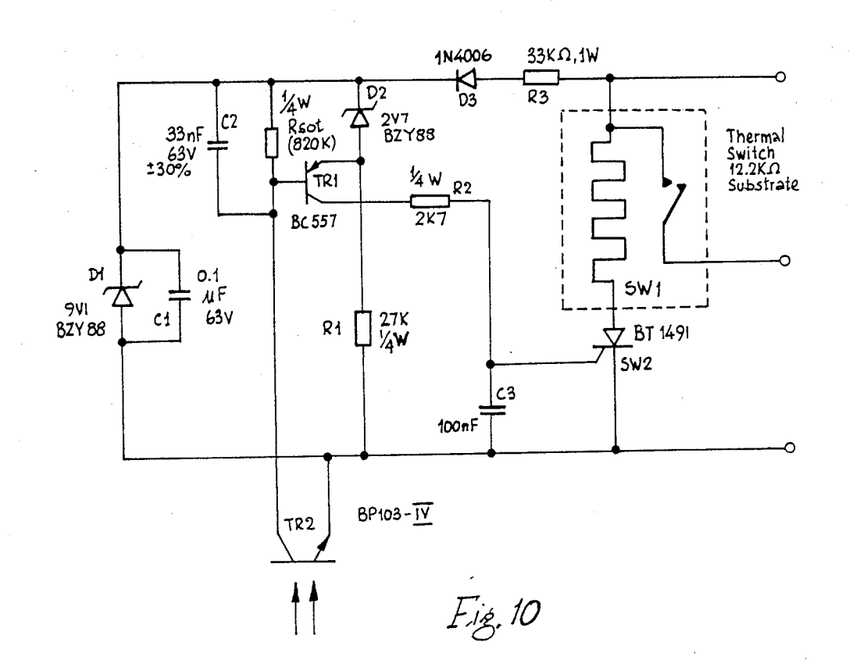

Referring to FIG. 10 there is illustrated the circuit diagram of another controller for use with a photoelectric switch such as the photoelectric switch described above with reference to FIGS. 1 to 8. The controller again comprises a photoelectric sensor, comparing means for comparing the intensity of sensed light with a preset light intensity and switching means operated by the comparing means to switch an output.

In this case the photoelectric sensor comprises a phototransistor, TR2 which is typically of type BP103—IV and the switching means comprises a thermal switch SW1. The operation of the switch SW1 is controlled through a control means comprising a transistor TR1, typically type BC557 and a thyristor SW2, typically type BT149E.

The phototransistor TR2 sets up a current flow, in the order of microamps, which is directly proportional to the sensed ambient light level. This current flow develops a potential across a resistor Rsot and this level is applied to the base of the transistor TR1. The transistor TR1 conducts when its base voltage drops below the rail voltage by more than 3.3 V. This threshold is set by zener diode ZD1 and the emitter-base junction voltage of the transistor TR1. Thus, the transistor TR1 conducts only when its base voltage drops 3.3 V below the rail voltage. When the transistor TR1 conducts it drives the gate of the thyristor SW2 through a resistor R2 and this in turn maintains the thyristor SW2 in conduction. Capacitor $C_3$ connected between the thyristor gate and ground is included to prevent the thyristor going, inadvertently, into conduction due to mains noise and switching transients. When conducting, the thyristor SW2 applies power to the heating element of the thermal switch SW1 and after about 30 seconds heating the switch contacts open and remain open until power is removed from the heating element and sufficient cooling time (about 40 seconds) is allowed.

During daylight hours the phototransistor TR2 conducts maintaining the transistor TR1 and thyristor SW2 in conduction. Thus, the thermal switch contacts are held open during daylight. At night-time the phototransistor current is small causing the transistor TR1 and thyristor SW2 not to conduct, so no power is applied to the switch heating element and the thermal switch contacts are allowed to close.

The switch action is arranged so that failure of any of components in the circuit will most likely result in the switch contacts closing permanently.

The power supply is derived from the mains supply by rectification and reduction to 9.1V+/−2 V. A diode D1 performs the rectification and zener diode ZD2 clamps the supply voltage at the desired level. A resistor R3 limits the current to the zener diode. No smoothing is performed and all activity takes place during the positive half of the mains cycle. This is adequate since the switch heating element is driven only during the positive half cycle. A capacitor C1 is used to attenuate mains borne spikes and works in conjunction with R3. A capacitor C2 is used to prevent the transistor inadvertently conducting during the rising edge of the positive mains cycle. It has been found that the phototransistor TR2 takes up to 1mS to settle when power was applied and this tended to driven the transistor TR1 into conduction.

The ambient light level switchover threshold and the thermal switch delay are calibrated as follows. Thermal switch delay adjustment is done mechanically by means of an adjustment screw on the switch mechanism. Light level adjustment is carried out by placing the controller to be calibrated in a desired ambient light level, such as 55 lux. The value of Rsot is then adjusted and the voltage waveform between the anode and cathode of the thyristor is monitored on an oscilloscope. When a "zero volts" level extends for more than 7.5 ms the controller will be calibrated.

By understressing the components, using a phototransistor, elimination of tantalum or electrolytic capacitors, using zener diode/capacitor protection, minimising ambient temperature levels and the use of high quality components, the reliability of the circuit is assured this tending to a long useful life. These various features are discussed in more detail below.

A power supply voltage of under 11V is used in the design and all components whose reliability is related to voltage stressing are specified to have withstand voltages well in excess of this. The transistor and the phototransistors have breakdown voltages of 45 V and 35 V respectively. These are much larger than the supply voltage and, in addition, even when a mains transient is present the resistance of the circuitry surrounding the devices is high enough to prevent destructive power disipation from occuring in most cases. The thyristor has a withstand voltage of 500 V and if a mains transient should occur that exceeds this voltage damage is unlikely to occur. A 10,000 V spike would cause a current pulse of 0.833 A to flow in the thyristor and heating element. However, the thyristor is capable of conducting an 8 A pulse without damage. Also the heating element is unlikely to sustain damage due to its high specific heat capacity and the short duration of the transients.

Experience gained when designing with light dependent resistors has highlighted the high drift characteristics of these devices. In the present design the thermal switch is driven electronically thus allowing the use of a phototransistor as the sensing element. Phototransistor devices offer very good drift characteristics compared to light dependent resistor (LDR) devices and reduce the possibility of the unit's threshold values wandering outside the defined limits. The main disadvantage of phototransistors, their low breakdown voltage, has been overcome by means of low voltage circuitry driving the thermal switch.

A difficulty associated with electronic implementations for lighting controllers is the need to use electrolytic or tantalum capacitors. Standard devices tend to be unreliable and to obtain the required reliability levels expensive devices with voltage ratings at least twice the actual supply voltage must be used. The present design obviates the need for large value capacitors as no smoothing is required. Also, the switch on/off delay is provided by the thermal switch.

Protection against short duration transients on the mains line is provided using a capacitor and zener diode. The capacitor ensures that the rise time of the transient is greater than the turn-on time of the zener diode. This will prevent most transient spikes from affecting the circuit.

Preferably the resistors are metal oxide film devices which are more reliable than carbon based devices.

Preferably the semiconductor devices are chosen from ranges with proven reliability, such as the BZY88 series zener diodes, the BC557 transistors and the B7147 thyristor.

We claim:

1. A photo-electric control unit for a lighting circuit comprising:
    control means including a photo-electric sensor for switching a lamp which is a heat source output;
    electrical connection means between the control means and the output, the electrical connection means comprising connector pins;
    a cooling chamber for dissipating heat generated by the output conducted by the pins, the cooling chamber comprising a base wall and a side wall upstanding from the base wall; and
    the connector pins extending through the cooling chamber and being cranked intermediate the ends thereof to define a cooling chamber base wall portion and a cooling chamber side wall portion for heat transfer from the pins to the walls of the chamber.

2. A photo-electric control unit as claimed in claim 1, wherein the chamber is substantially filled with a heat conducting medium.

3. A photo-electric control unit as claimed in claim 2 in which the heat conducting medium comprises a potting compound.

4. A photo-electric control unit as claimed in claim 1 wherein the control means comprises a printed circuit board mounted in a printed circuit housing, the photo-electric sensor being mounted to the printed circuit board, the unit including a cover of translucent material through which light passes to the photo-electric sensor.

5. A photo-electric control unit as claimed in claim 1 in which the connector pins are connected to the output through a socket mounted in a socket receiving chamber connected to the cooling chamber.

6. A photo-electric control unit as claimed in claim 5 in which the socket receiving chamber includes mounting means for mounting the unit to a fixture.

* * * * *

UNITED STATES PATENT AND TRADEMARK OFFICE
CERTIFICATE OF CORRECTION

PATENT NO.   :  4,791,290

DATED        :  December 13, 1988

INVENTOR(S)  :  Sean Noone, et al.

It is certified that error appears in the above-identified patent and that said Letters Patent is hereby corrected as shown below:

Column 1, line 41:  "Conventioanl" should read as --Conventional--

Column 3, line 18:  "The advantages of" should read as --The advantage of--

Column 8, line 11:  "realy" should read as --relay--

Column 8, line 42:  "174 X $\pm$5%" should read as --1/4 X $\pm$5%--

Signed and Sealed this

Ninth Day of January, 1990

*Attest:*

JEFFREY M. SAMUELS

*Attesting Officer*      *Acting Commissioner of Patents and Trademarks*